United States Patent Office 3,428,550
Patented Feb. 18, 1969

3,428,550
CRYSTALLINE ALUMINOSILICATE-CONTAINING CATALYST AND METHODS OF TREATING AND USING SAME
Henry Erickson, Park Forest, and Marvin F. L. Johnson, Homewood, Ill., assignors to Sinclair Research, Inc., New York, N.Y., a corporation of Delaware
No Drawing. Filed Aug. 10, 1966, Ser. No. 571,400
U.S. Cl. 208—120                11 Claims
Int. Cl. C10g 11/04; B01j 11/40

ABSTRACT OF THE DISCLOSURE

Crystalline aluminosilicate is combined with a hydrous alumina mixture consisting of about 10 to 90% amorphous hydrous alumina and about 10 to 90% alumina monohydrate having a crystallite size of up to about 50 A. The aluminosilicate is one having pores in the 8 to 15 A. size range and a molar ratio of silica to alumina of at least about 3.5:1, e.g. synthetic faujasite. The resultant composition when dried, is useful as a cracking catalyst, the activity and selectivity of which can be enhanced by mild steam treatment.

---

This invention relates to a composition which can be employed to enhance the conversion of various chemicals, especially hydrocarbons. More specifically, this invention provides an alumina-crystalline aluminosilicate composition which is useful, for instance, as a catalyst precursor, or catalyst and which can be treated with steam to improve the activity, selectivity and stability of the catalyst, particularly with respect to hydrocarbon conversion processes.

A considerable number of materials have theretofore been proposed as catalysts for the conversion of hydrocarbons to one or more desirable products. Catalysts are generally selected on the basis of their initial activity and selectivity in achieving the desired conversion, and, in addition, on their stability to reaction and catalyst regeneration conditions. However, it has been found that well known catalysts, e.g., amorphous-alumina composites, provide a limited amount of product for a given yield of coke and further suffer from the disadvantage of rapidly deteriorating and becoming inactive in the presence of steam. Since steaming has been found to be one of the most effective ways of removing entrained oil from the spent catalyst prior to regeneration or carbon burn-off by contact with air, and since steam is accordingly encountered in commercial catalytic cracking equipment, it is apparent that a catalyst characterized by good steam stability is highly desirable.

In accordance with the present invention there are provided alumina-crystalline aluminosilicate compositions which are especially useful as catalysts or catalyst precursors, and these compositions can be enhanced in terms of catalytic activity and selectivity by mild steam treatment. In addition the compositions are resistant to deterioraion when contacted with steam under more severe conditions. The compositions of the present invention are composites containing as essential ingredients about 15 to 80 percent by weight of a small particle size crystalline aluminosilicate having relatively uniform pores in the 8 to 15 A. size range and a silica-to-alumina molar ratio of at least about 3.5:1, and about 20 to 85 percent by weight of a mixture of amorphous hydrous alumina and alumina monohydrate having a crystallite size of up to about 50 A., preferably about 20 to 40 A., as determined by X-ray diffraction analysis of dried samples. The preferred composites contain about 35 to 65 percent by weight of each of the crystalline aluminosilicate and mixture of amorphous hydrous alumina and alumina monohydrate. The mixed hydrous alumina contains about 10 to 90% by weight of amorphous hydrous alumina, preferably about 10 to 50% or even about 20 to 35%, and about 10 to 90 weight percent, preferably about 50 to 90% or even about 65 to 80%, of alumina monohydrate, as determined by X-ray diffraction analysis of dried samples. The composition may also contain minor amounts of other materials, for instance, alumina trihydrates. The percentages of said crystalline aluminosilicate, amorphous hydrous alumina and alumina monohydrate are designated on a non-hydrate or dry basis. Drying of the composite can be accomplished by various suitable techniques, conveniently at temperatures of about 225 to 450° F., and the composition may be further activated from the catalytic standpoint by drying under calcination conditions to remove a portion, but not all, of the combined water of the composite in accordance with catalyst activation methods. Calcination is frequently conducted at temperatures of about 700 to 1300° F. and may be accomplished, as is often the case, in catalytic reaction systems by charging the composite, after initial drying to remove free water, to the regenerator of the hydrocarbon conversion unit.

The crystalline aluminosilicate-alumina composite may by itself serve as a catalyst, or be a catalyst precursor, for instance, be dried and then used in the cracking of higher boiling hydrocarbons to gasoline, or the composite may serve as a support for avrious catalytic metals in producing catalysts exhibiting effectiveness in a variety of reactions. In catalytic cracking the conversion temperature is often in the range of about 800 to 1000° F. and the pressure is approximately atmospheric or elevated. The catalyst may be employed in any desired physical form, for instance, as a fluidized mass in which the catalyst particles are often in the size range of about 20 to 150 microns, or as macrosized particles, say of about 1/64 to ½" in diameter and up to about 1" or more in length. In the latter form the particles are frequently disposed as a fixed catalyst bed.

As previously noted, it has been found that the activity and selectivity of the alumina-crystalline alumino-silicate composites can be substantially improved by a mild steam treatment. The steam treatment may be carried out at a temperature of about 950 to 1500° F. for at least about 1 hour, and no further benefit is known to be provided if the treatment continues beyond about 100 hours. Preferably, the steam treatment is carried out at a temperature of about 1050 to 1400° F. for a period of about 12 to 48 hours.

The compositions of the present invention are resistant to the effect of high temperature steam which may be present in catalytic reactors and during regeneration, especially in cracking units. In fact, when using steam diluted regeneration techniques, enhancement of catalytic activity may be expected. This greater stability may be utilized in various ways. For example, higher temperatures and steam rates can be used before regeneration, allowing for more efficient stripping of used catalyst in the hydrocarbon or other conversion reaction system, and resulting in higher recovery of liquid hydrocarbons and a lesser load in the regenerator. Since many, if not most, catalytic cracking units are limited in through-put by coke-burning capacity in regeneration, a small increase in stripper efficiency is magnified in importance.

Other advantages of high temperature steam resistance include the possibility of increasing the coke-burning capacity by increasing regenerator temperature. Many units are limited in this respect to lower than otherwise feasible through-puts. In addition, feedstocks higher in coke-precursors than customary may be utilized if coke-burning limitations are raised by more efficient stripping and higher regeneration temperatures.

The small particle size crystalline alumino-silicates which are in admixture with the hydrous alumina to form the composites of the present invention have a silica-to-alumina ratio of at least about 3.5 to 1 and pores of about 8 to 15 A. size, preferably about 10 to 14 A. Usually with a given material the pores are relatively uniform in size and the crystalline alumino-silicate particles can have a particle size less than 5 microns, more preferably, up to 3 microns and a silica-to-alumina mole ratio up to about 12 to 1, most advantageously about 4 to 6 to 1. The crystalline aluminosilicates are usually prepared in the sodium form and are sometimes referred to as synthetic faujasites.

To convert the crystalline aluminosilicates of the present invention to active catalysts, the sodium cations can, if desired, be replaced in part or entirely by ion-exchange with other monovalent, divalent or trivalent cations. Among the forms of the crystalline aluminosilicates which can be produced are those obtained by ion-exchange such as, for example, with hydrogen, ammonium, magnesium, calcium, and the rare earth metals. These forms may easily be obtained from the corresponding sodium aluminosilicates by ion-exchange techniques. Thus, calcium ions, for example, may replace part or all of the sodium ions to produce the calcium form, or the sodium ions can also be exchanged partially or completely with ammonium ions to give the ammonium form of the ammonium crystalline aluminosilicate can be dried or calcined to obtain the hydrogen form through ammonia release. Other techniques can be employed to produce the hydrogen form, but the ammonium exchange is the most common. The hydrogen form of the crystalline aluminosilicate is preferred; and preferably at least about 60% or even at least about 80% of the sodium is replaced by ammonium ions and the resulting material dried and/or calcined to drive-off ammonia and give the hydrogen form.

One method for preparing the mixed amorphous hydrous alumina monohydrate component of the compositions of the present invention is through the reaction of water and finely divided aluminum metal, the reaction being conducted in the presence of a non-oxidizing acid. The aluminum employed can be finer than most materials referred to as "powder" and the metal used may have a surface area of about 75,000 to 1,000,00 square millimeters per gram, preferably about 150,000 to 600,000 mm.$^2$/gm. The aluminum is usually one where at least about 90 percent can pass a 325 mesh sieve (U.S. Standard Sieve Series). The aluminum particles may often be primarily in the size range of about 2 to 100 microns. Preferably, at least about 50 percent of the particles are of about 10 to 40 microns. The aluminum may have a purity greater than about 99 percent or even greater than about 99.9 percent and may be obtained by atomizing molten aluminum in air.

In making the alumina, an acid, preferably formic acid, can be supplied to the reaction between the aluminum and water, and the amount of acid is usually insufficient to supply one acid ion for each two atoms of aluminum, that is to say, the ratio of aluminum atoms to acid anions is greater than 2/1 and may be up to about 30/1 or more. Preferably, the ratio of aluminum atoms to acid anions is about 5 to 15 or even about 25/1. Usually the reaction will be conducted at a pH below about 4.1. The water-soluble, organic carboxylic acids are preferred for use in the reaction, particularly the saturated lower fatty acids of 1 to 2 carbon atoms such as formic acid, acetic acid and trichloroacetic acid. Suitably, the acid is used in dilute form to keep the pH of the reaction within the range of about 3 to 4 and incremental addition of the acid during the course of the reaction will facilitate the maintenance of the desired pH.

Water in the liquid phase is present in the reaction mixture in amounts sufficient to keep the mixture fluid. The ratio of water to aluminum can be at least about 9 moles of water per gram atoms of aluminum, preferably about 20 to 30:1. Larger amounts of water, that is, greater than about 30 moles per gram-atom of aluminum, say up to about 60 or 75 moles, do not seem to offer any advantages to offset the need for a larger reactor volume and a need to filter the resulting alumina product to get a practical slurry concentration. Where aluminum is added incrementally to the reaction mixture, it is possible and sometimes feasible to use slightly less than 10 moles of water per gram-atom of aluminum. The total reaction mixture thus usually contains a ratio of about one mole acid to about 2 to 30 gram-atoms of aluminum metal to at least about 18, e.g. about 18 to 2,250 moles of water. Preferably about 100 to 750 moles of water and 5 to 15 gram-atoms of aluminum are used per mole of acid.

It may often be preferred to add the aluminum metal and/or the formic acid incrementally to the water during the course of the reaction. Such incremental additions of formic acid and aluminum metal can preferably be at such rates that the approximate 1/5–15/100–750 acid-aluminum-water ratio and the 3 to 4 pH are maintained essentially throughout the reaction. Such manipulations accelerate the rate of reaction and provide for improved concentration of $Al_2O_3$ in the product slurry. For ease of handling, the fine aluminum powder may often be transported to the reaction zone as a slurry in water.

Reaction conditions generally include a temperature of at least about 60° C., although the reaction may be slow below the preferred range of about 90 to 110° C. The reaction can readily take place at a higher temperature, e.g. up to about 500 pounds steam pressure, that is, about 250° C., but pressurized equipment is required at this temperature to keep the necessary liquid phase. At the preferred temperature or below, one atmosphere pressure is satisfactory and water may be refluxed during the reaction. A characteristic of this manner of obtaining synthetic alumina is that the product may be in relatively high concentration in the water slurry, often about 5 to 12 weight percent, and may be further concentrated by evaporation of water.

The following examples are representative of the present invention but are not to be considered as limiting. Example A gives a procedure for making the amorphous hydrous alumina-boehmite mixture. Examples I, II and III describe the preparation of catalysts A, B and C respectively which are representative of the catalysts of the present invention. These catalysts are compared in Table I with catalyst D which is a commercially-available crystalline aluminosilicate cracking catalyst.

EXAMPLE A

To a 1-liter, fluted, three-necked Pyrex flask fitted with a high-speed two-bladed agitator, a reflux condenser and a thermoregulator was added 500 cc. of de-ionized water, 1 cc. of 88% formic acid and 6.25 grams of atomized aluminum metal (99.5% purity, surface area of 310,000 mm.$^2$/g.; particle size distribution of 5–50$\mu$). The agitator was set to rotate at 1800 r.p.m. and the reaction was initiated at room temperature. As the temperature rose, the rate of hydrogen production increased. The temperature was allowed to reach 100° C. and maintained at this temperature. At the end of 1.5 hours an additional 6.25 grams of aluminum metal and 10 cc. of 0.684 molar formic acid were added to the reaction mixture. Further equal additions of aluminum metal were made at 3.5, 4.5, 5 and 6 hours total reaction time, so that a total of 25 grams of aluminum metal had been added. During the time interval of 2–6 hours, 0.684 molar formic acid solution was added until a total of 0.095 moles of 100% formic acid had been added. The reaction was allowed to continue for a total of 12 hours at the end of which the reaction mixture was completely free of aluminum.

The pH of the reaction mixture was shown to be 3.4. The pH was adjusted to 8.4 with a 1:10 dilution of ammonium hydroxide in water. The mixture gelatinized as the pH was increased. The gelled product was filtered and dried at 110° C.

X-ray diffraction analysis showed the dried product to consist of 22% amorphous hydrous alumina and 78% boehmite with a crystallite size of 27.8 angstroms. The dried product had a surface area of 255 m.²/g. (BET).

EXAMPLE I 772 grams of a slurry of a mixed alumina hydrate, prepared essentially as in Example A, were mixed with 20 grams of a synthetic, faujasite type crystalline sodium aluminosilicate having pores in the 10–14 A. range, a particle size of about 1 micron, a silica-to-alumina mole ratio of about 5.25 (designated commercially as a Y-crystalline aluminosilicate type), and exchanged with about 89% ammonium ions. The catalyst slurry was mixed for about ten minutes with a high speed propeller stirrer. The above amount corresponded on a non-hydrate basis to 85 grams of alumina and 15 grams of the crystalline aluminosilicate, respectively. The heavy slurry was re-mixed for two minutes in a high speed Waring blender and dried overnight at 230° F. in a forced draft oven. The dried product was ground to pass a 20 mesh sieve and represents catalyst A in Table I.

EXAMPLE II

Catalyst B of Table I was prepared in exactly the same manner as catalyst A using 454 grams of the alumina hydrate and 62.5 grams of the crystalline aluminosilicate. These amounts correspond to 50 grams of alumina and 50 grams of the crystalline aluminosilicates on a non-hydrate basis.

EXAMPLE III

Catalyst C in Table I was prepared in exactly the same manner as catalyst A from 182 grams of the alumina hydrate and 100 grams of the crystalline aluminosilicate. These amounts correspond to 20 grams of alumina and 80 grams of the crystalline aluminosilicate respectively on a non-hydrate basis.

The first set of values in Table I was obtained from a bench scale catalytic cracking test following three hours of catalyst calcination at 1050° F. The feed to the cracking unit was a straight run petroleum gas oil and the principal product was gasoline hydrocarbons. The second set of data was obtained after the catalyst had been steamed for 24 hours at 1150° F. at one atmosphere of steam in a fixed bed. The third set of data was obtained when the catalysts were resteamed for six hours at 1450° F. and at one atmosphere of steam in a fixed bed. The results are tabulated in Table I.

TABLE I

| Sample Designation | A | B | C | D |
|---|---|---|---|---|
| Percent crystalline Aluminosilicate | 15 | 50 | 80 | ¹ 5–10 |
| Test Values: | | | | |
| Relative Activity | 79.5 | 225.0 | 327.0 | 182.0 |
| D+L | 50.5 | 74.8 | 84.4 | 70.2 |
| Gas Factor | 0.70 | 0.83 | 0.93 | 0.75 |
| Coke Factor | 0.81 | 0.76 | 1.06 | 0.72 |
| Gas Gravity | 1.42 | 1.47 | 1.39 | 1.54 |
| Steamed 24 hrs. 1,150° F.: | | | | |
| Relative activity | 108.0 | 290.0 | 280.0 | 173.0 |
| D+L | 58.0 | 80.7 | 79.8 | 69.0 |
| Gas factor | 0.48 | 0.51 | 0.55 | 0.52 |
| Coke factor | 0.44 | 0.50 | 0.57 | 0.37 |
| Gas gravity | 1.36 | 1.61 | 1.57 | 1.60 |
| Resteamed 6 hrs. 1,450° F.: | | | | |
| Relative activity | 39.9 | 140.0 | 16.9 | 31.1 |
| D+L | 35.7 | 63.8 | 21.2 | 31.0 |
| Gas factor | 1.17 | 0.48 | 1.18 | 0.75 |
| Coke factor | 1.07 | 0.38 | 1.16 | 0.84 |
| Gas gravity | 1.14 | 1.51 | 1.27 | 1.40 |

¹ From X-ray diffraction analysis.

The first set of data as a result of the bench scale catalytic cracking tests shows an increase in activity with an increase in the content of the crystalline aluminosilicate as represented by catalysts A, B and C. Catalyst D is included to show the effect of steam on a commercial crystalline aluminosilicate containing catalyst.

The second set of data shows that the selectivity, as represented by gas and coke factors, is improved for all catalysts in response to low temperature steaming. Surprisingly, catalyst A and catalyst B show a major increase in activity and catalyst C, while still very active, is less active than before steaming. Catalyst D shows little effect from the steam treatment.

The third set of data resulting from resteaming for six hours at 1450° F. shows that the commercial catalyst (D) was sharply reduced in activity. Catalyst A, although reduced in activity, retains a much higher percentage of its activity than catalyst D. Catalyst C is also highly de-activated. However, catalyst B retains a very high activity and a remarkable selectivity. Thus, it is apparent that the catalyst of the present invention is unique in that it improves in performance on mild steaming, and in some cases retains an exceptional activity following re-steaming at higher temperatures.

It is claimed:
1. A composition consisting essentially of about 15 to 80% by weight of crystalline aluminosilicate having pores in the range of 8 to 15 A. and a molar ratio of silica to alumina of at least about 3.5:1, and about 20 to 85% by weight of a hydrous alumina mixture consisting of about 10 to 50 weight percent of amorphous hydrous alumina and about 50 to 90 weight percent of alumina monohydrate having a crystallite size of up to about 50 A.

2. The composition of claim 1 in which the pores of the crystalline aluminosilicate are 10 to 14 A., the molar ratio of silica to alumina is about 4 to 6:1, and the particle size of the crystalline aluminosilicate is up to 3 microns.

3. The composition of claim 2 in which the mixture of amorphous hydrous alumina and alumina monohydrate contains about 65 to 80 weight percent of alumina monohydrate having a crystallite size of about 20 to 40 A.

4. The composition of claim 3 in which the crystalline aluminosilicate is synthetic faujasite and each of the hydrous alumina mixture and synthetic faujasite is about 35 to 65 weight percent of the composition.

5. A composition formed by drying a mixture consisting essentially of about 15 to 80% by weight of a crystalline aluminosilicate having pores in the range of 8 to 15 A. and a silica to alumina molar ratio of at least about 3.5:1, and in which at least about 80% of the cations are hydrogen, and about 20 to 85% by weight of a hydrous alumina mixture consisting of about 10 to 50 weight percent of amorphous hydrous alumina and about 50 to 90 weight percent of alumina monohydrate having a crystallite size of up to about 50 A.

6. The composition of claim 5 in which the pores of the crystalline aluminosilicate are 10 to 14 A., the particle size of the crystalline aluminosilicate is up to 3 microns, and the molar ratio of silica to alumina is about 4 to 6:1.

7. The composition of claim 6 in which the hydrous alumina mixture contains about 65 to 80 weight percent of alumina monohydrate having a crystallite size of about 20 to 40 A., the crystalline aluminosilicate is synthetic faujasite, and each of the hydrous alumina mixture and synthetic faujasite is about 35 to 65 weight percent of the composition.

8. In a process for cracking hydrocarbons boiling above the gasoline range by contacting the hydrocarbons with a catalyst composition consisting essentially of a dried mixture of about 15 to 80% by weight of crystalline aluminosilicate having pores in the range of 8 to 15 A. and a molar ratio of silica to alumina of at least about 3.5:1 and about 20 to 85% by weight of an alumina matrix to produce gasoline boiling range hydrocarbon, the improvement whereby the catalyst is stabilized by employing as the alumina matrix a hydrous alumina mixture consisting of about 10 to 50 weight percent of amorphous hydrous alumina and about 50 to 90 weight percent of alumina monohydrate having a crystallite size of up to about 50 A.

9. The improvement of claim 8 in which the pores of the crystalline aluminosilicate are 10 to 14 A., the particle size of the crystalline aluminosilicate is up to 3 microns, and the molar ratio of silica to alumina is about 4 to 6:1.

10. The improvement of claim 9 in which the hydrous alumina mixture contains about 65 to 80 weight percent of alumina monohydrate having a crystallite size of about 20 to 40 A., the crystalline aluminosilicate is synthetic faujasite, and each of the hydrous alumina mixture and synthetic faujasite is about 35 to 65 weight percent of the catalyst composition.

11. The improvement of claim 10 in which the hydrocarbon cracked is a petroleum gas oil and the cracking is conducted at about 800 to 1000° F.

References Cited

UNITED STATES PATENTS

| | | | |
|---|---|---|---|
| 3,140,253 | 7/1964 | Plank et al. | 208—120 |
| 3,260,680 | 7/1966 | Sanford et al. | 252—455 |

DELBERT E. GANTZ, *Primary Examiner.*

U.S. Cl. X.R.

252—455